United States Patent Office 3,035,025
Patented May 15, 1962

3,035,025
POLYESTER RESIN CONTAINING PYRIDINE DICARBOXYLIC ACID
Ronald L. Broadhead, Park Forest, and Ellis K. Fields, Chicago, Ill., assignors to Standard Oil Company, Chicago, Ill., a corporation of Indiana
No Drawing. Filed Apr. 24, 1959, Ser. No. 808,577
1 Claim. (Cl. 260—75)

This invention relates to polyester resins containing pyridine nitrogen from pyridine dicarboxylic acid and particularly to water soluble resins produced therefrom.

The surface coating industry has been trying to produce water soluble resins which give durable films when applied to metals or other hard surfaces and baked at elevated temperatures such as 300° F. The fire hazard attendant with the use or organic solvents is a major consideration. An object of the invention is a nitrogen containing polyester resin prepared from a glycol and a pyridine dicarboxylic acid, which resin can be readily converted to a water soluble material. Another object is a water soluble polyester resin containing pyridine nitrogen. A further object is a water soluble polyester resin adapted for forming a baked-finish surface coating. A particular object is a water-soluble polyester resin of basic character which is capable of forming baked-finish surface coatings. Other objects will be apparent from the detailed description of the invention.

The nitrogen-containing polyester resin, which forms a part of this invention, is prepared by condensing—under typical polyesterification condensation reaction conditions—a pyridine dicarboxylic acid and a glycol containing from 2 to about 10 carbon atoms. Said pyridine acid and said glycol are charged to the condensation zone in a mole ratio of glycol:pyridine acid from 1:1 to about 1.4:1. (This mole ratio is more preferably 1.05–1.20:1.) The condensation reaction is continued until the condensation is essentially complete—as determined by the production of water in essentially the theoretical stoichiometric amount or, more readily, by stopping just before a gelation reaction starts in the condensation zone.

This nitrogen-containing polyester resin (hereinafter spoken of as the "condensate") is soluble in organic solvents, particularly oxygenated materials such as alcohols, ethers and ketones. This condensate is converted into a resinous material of high solubility in water by treatment with an acid of appreciable water solubility; enough acid is used in the water-solubilization reaction to obtain a resin of high solubility.

The glycols which are suitable for use in the preparation of the resin of the invention contain from 2 to about 10 carbon atoms and include not only the simple glycols but also the ether glycols. Examples of suitable glycols are ethylene glycol, hexanediol, nonanediol, diethylene glycol, tetraethylene glycol, and tripropylene glycol. The simple glycols, such as propanediol and butanediol, are particularly suitable.

The pyridine dicarboxylic acid and the defined glycol are reacted at polyesterification-condensation reaction conditions which avoid any cross-linking reaction—this cross-linking reaction is commonly called gelation. The reaction is carried out in an inert atmosphere at a temperature between about 100° C. and 240° C. and water produced in the reaction is continuously withdrawn. In the case of lower boiling glycols, or where the reaction is carried out in the presence of a non-reactive solvent, condenser means are provided for returning glycol and/or solvent to the reaction zone. The reaction is continued for a time determined by the temperature of reaction and the particular glycol charged. Most usually the reaction is continued until just short of the appearance of cross-linking as evidenced by an abrupt increase of viscosity of the material in the reaction zone or as determined by the production of water in essentially the theoretical stoichiometric amount.

The pyridine acid and the glycol are charged in a mole ratio of glycol:pyridine acid of at least 1:1, preferably an excess of glycol is charged—generally the maximum ratio is about 1.4:1. More usually this mole ratio is from 1.05–1.20:1. This condensate is characterized by a substantial amount of free hydroxyl groups and is low in carboxyl groups.

The condensate is readily converted to a resin of high solubility in water by treatment of the condensate with an acid. This acid is of appreciable water solubility and also is not subject to harmful reactions such as oxidation—sulfuric acid and nitric acids are such good oxidizers they cannot be used herein. While the water-solubilizing treatment is preferably carried out in water as the reaction medium, other aqueous media may be used—particularly when the acid has a water solubility so low that an excessive amount of water must be present or incremental addition of the acid to the solubilization zone must be practised. Such other aqueous media may be: aqueous methanol or aqueous acetone. The condensate is agitated with the aqueous acid medium until the condensate passes into solution in the aqueous acid medium—enough acid and aqueous medium are added to bring all the condensate resin into solution. The water solution of the resin are usually opalescent liquids, resembling soap solutions.

It is thought that the acid reacts with the pyridine nitrogen present in the condensate resin. In general at least enough acid is used to about equal the stoichiometric requirement for reaction with the pyridine-nitrogen in the condensate.

The water-solubilizing acids have appreciable water solubility; it is to be understood that acids of low actual solubility may be used by means of incremental addition of acid to the aqueous medium during the course of the solubilization reaction, i.e., where the amount of water would be too great by having all the acid present at the start of the reaction. Or the aqueous medium may contain an alcohol or ketone which increases the solubility of the acid to the desired degree.

Illustrations of suitable acids are: (1) the lower alkanoic acids, such as, formic, acetic, butyric and octanoic; (2) the lower benzene monocarboxylic acids, such as, benzoic and toluic; and (3) the inorganic acids such as the hydrogen halides and phosphoric acids. Benzoic acid is particularly suitable when corrosion resistance is desired in a surface coating. Eminently suitable acidic media are: aqueous formic, aqueous acetic, dilute aqueous hydrochloric, dilute aqueous phosphoric and aqueous methanol-benzoic.

The water-solubilization reaction is usually carried at ordinary temperatures; although moderately elevated temperatures may be used. In general the reaction is at a temperature from 15° C. to 80° C. and more usually from about 25° C. to 50° C.

The water soluble resin product of the invention is readily converted to hard thermoset solid by holding the resin on the order of a temperature of 300° F. to 400° F. for a time needed to complete the cross-linking reaction and the length of time to form the thermoset solid will be dependent upon the temperature and the dimensions of the object being heated.

The water soluble resin product of the invention may be used for the formation of surface coatings by dissolving the resin water, if not maintained in the aqueous solubilization reaction medium. The solution is applied to the surface of the material to be protected and the resin is converted to a hard surface coating by baking, preferably at a temperature of about 300° F. for the necessary time.

When it is desired to have a pigmented coating or the benefits of additional strength and reinforcement of inorganic materials, the solution of resin may be admixed with inorganic materials, such as carbonates and/or pigments such as titanium oxide or lead oxide. These mixtures are then applied to the surface to be protected and are baked to produce hard enamel type finish.

*Example*

Diethylene glycol (38.2 g.—0.037 mole) was heated in a stirred flask provided with a water-trapout reflux condenser. 2,5-pyridine dicarboxylic acid (55.6 g.—0.030 mole) was added and the whole heated to 195–200° C. and held at this temperature for 30 minutes; then the temperature was lowered to 170–175° C. and held for 8 hours—water of reaction was withdrawn continuously. The resin was a brown solid that was tacky to the touch and adhered to a steel spatula. The resin melted in the region of 40–50° C.

The polyester resin was solubilized with both (*a*) dilute aqueous hydrochloric acid and (*b*) dilute aqueous phosphoric acid to obtain water soluble resins solution having an opalescent appearance.

Films were formed from these solutions on both glass plates and tin plates; these films baked out in 2 hours at 300° F. to give a brown colored protective coating. (The hydrochloric acid appears to "evaporate" during the baking operation.)

Thus having described the invention what is claimed is:

A water-soluble resin prepared by (1) condensing diethylene glycol and a pyridine dicarboxylic acid, in a mole ratio of glycol to pyridine acid from 1:1 to about 1.4:1, in an inert atmosphere, at a temperature between about 100° C. and 240° C., with continuous withdrawal of water of reaction until said condensation reaction is essentially complete, and (2) then reacting at a temperature from 15° C. to 80° C. said condensate with aqueous hydrochloric acid in an amount such that a product resin of substantial solubility in water is obtained.

References Cited in the file of this patent
UNITED STATES PATENTS

| | | |
|---|---|---|
| 1,932,688 | Brubaker | Oct. 31, 1933 |
| 2,197,855 | Ellis | Apr. 23, 1940 |